(12) United States Patent
Yu et al.

(10) Patent No.: US 11,591,469 B2
(45) Date of Patent: Feb. 28, 2023

(54) RESIN COMPOSITION AND ARTICLE MADE THEREFROM

(71) Applicant: Elite Material Co., Ltd., Taoyuan (TW)

(72) Inventors: Yi-Fei Yu, Taoyuan (TW); Chien-Hung Lee, Taoyuan (TW); Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 391 days.

(21) Appl. No.: 16/923,340

(22) Filed: Jul. 8, 2020

(65) Prior Publication Data

US 2021/0371656 A1 Dec. 2, 2021

(30) Foreign Application Priority Data

May 26, 2020 (TW) ................................. 10911744.6

(51) Int. Cl.
| | | |
|---|---|---|
| *C08L 79/08* | (2006.01) | |
| *C08G 73/02* | (2006.01) | |
| *C08K 5/00* | (2006.01) | |
| *C08K 5/101* | (2006.01) | |
| *C08G 73/10* | (2006.01) | |
| *C08F 36/14* | (2006.01) | |
| *C08G 73/06* | (2006.01) | |
| *C08J 5/24* | (2006.01) | |

(52) U.S. Cl.
CPC .............. *C08L 79/08* (2013.01); *C08F 36/14* (2013.01); *C08G 73/0233* (2013.01); *C08G 73/0611* (2013.01); *C08G 73/1007* (2013.01); *C08G 73/1039* (2013.01); *C08J 5/244* (2021.05); *C08J 5/246* (2021.05); *C08K 5/0025* (2013.01); *C08K 5/101* (2013.01); *C08L 2203/16* (2013.01); *C08L 2203/20* (2013.01)

(58) Field of Classification Search
CPC ...... C08L 79/08; C08J 2479/08; C08G 73/12; C08G 73/10; C08G 73/22; C08G 73/1042
See application file for complete search history.

(56) References Cited

U.S. PATENT DOCUMENTS

| | | | | |
|---|---|---|---|---|
| 2016/0168330 A1* | 6/2016 | Liao | ...................... | C08G 73/121 528/170 |
| 2018/0079856 A1* | 3/2018 | Yamaguchi | ............ | C08G 73/12 |
| 2018/0362733 A1* | 12/2018 | Yao | ...................... | C08K 5/3437 |

* cited by examiner

*Primary Examiner* — Gregory Listvoyb
(74) *Attorney, Agent, or Firm* — Muncy, Geissler, Olds & Lowe, P.C.

(57) ABSTRACT

A resin composition includes a first prepolymer and a second prepolymer, the first prepolymer being prepared from a first mixture subjected to a prepolymerization reaction, the second prepolymer being prepared from a second mixture subjected to a prepolymerization reaction, wherein the first mixture includes a maleimide resin and a benzoxazine resin, and the second mixture includes a maleimide resin and a bis(trifluoromethyl)benzidine. The resin composition may be used to make various articles, such as a prepreg, a resin film, a laminate or a printed circuit board, and at least one of the following properties can be improved, including copper foil peeling strength, dissipation factor, ratio of thermal expansion, cure shrinkage and glass transition temperature.

19 Claims, No Drawings

RESIN COMPOSITION AND ARTICLE MADE THEREFROM

CROSS-REFERENCE TO RELATED APPLICATION

This application claims the priority benefits of Taiwan Patent Application No. 109117446, filed on May 26, 2020. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward 5G and the trend of miniaturization and high performance of electronic equipment, communication devices and personal computers, circuit boards were also developed toward multi-layer configuration, high trace interconnection density, and high speed signal transmission, thereby presenting higher challenges to the overall performance of circuit laminates such as copper-clad laminates. In order to prevent deformation of copper-clad laminates due to the use of high temperature processes during product fabrication and the abnormal transmission of signal resulted from defective products, there is a need for developing materials for copper-clad laminates with lower ratio of thermal expansion.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

To achieve the above-mentioned object, the present disclosure provides a resin composition comprising a first prepolymer and a second prepolymer, the first prepolymer being prepared from a first mixture subjected to a prepolymerization reaction, the second prepolymer being prepared from a second mixture subjected to a prepolymerization reaction, wherein the first mixture comprises a maleimide resin and a benzoxazine resin, and the second mixture comprises a maleimide resin and a bis(trifluoromethyl)benzidine.

In the first mixture, the ratio of the maleimide resin and the benzoxazine resin is not particularly limited. For example, in one embodiment, the first mixture may comprise 100 parts by weight of the maleimide resin and 10 to 30 parts by weight of the benzoxazine resin.

For example, in one embodiment, the first mixture may optionally further comprise a first prepolymerization additive comprising a vinyl-containing polyphenylene ether resin, a small molecule vinyl compound, an acrylate, an epoxy resin, a cyanate ester resin, a phenolic resin or a combination thereof. For example, in one embodiment, the first mixture may comprise 100 parts by weight of the maleimide resin, 10 to 30 parts by weight of the benzoxazine resin and 10 to 40 parts by weight of a vinyl-containing polyphenylene ether resin, a small molecule vinyl compound, an acrylate, an epoxy resin, a cyanate ester resin, a phenolic resin or a combination thereof.

In the second mixture, the ratio of the maleimide resin and the bis(trifluoromethyl)benzidine is not particularly limited. For example, in one embodiment, the second mixture may comprise 100 parts by weight of the maleimide resin and 7.5 to 30 parts by weight of the bis(trifluoromethyl)benzidine. In another aspect, in one embodiment, in the second mixture, a ratio of an equivalent of vinyl group of the maleimide resin and an equivalent of amino group of the bis(trifluoromethyl)benzidine is 1:1 to 5:1.

For example, in one embodiment, the second mixture may optionally further comprise a second prepolymerization additive comprising a vinyl-containing polyphenylene ether resin, a small molecule vinyl compound, an acrylate, a polyolefin or a combination thereof. For example, in one embodiment, the second mixture may comprise 100 parts by weight of the maleimide resin, 7.5 to 30 parts by weight of the bis(trifluoromethyl)benzidine and 10 to 40 parts by weight of a vinyl-containing polyphenylene ether resin, a small molecule vinyl compound, an acrylate, a polyolefin or a combination thereof.

In the resin composition, the ratio of the first prepolymer and the second prepolymer is not particularly limited. For example, in one embodiment, the resin composition comprises 100 parts by weight of the first prepolymer and 3 to 50 parts by weight of the second prepolymer. For example, in another embodiment, the resin composition comprises 100 parts by weight of the first prepolymer and 8 to 35 parts by weight of the second prepolymer.

The resin composition may further optionally comprise other ingredients if needed. For example, in one embodiment, the resin composition further comprises a crosslinking agent which comprises a maleimide resin, a vinyl-containing polyphenylene ether resin, a small molecule vinyl compound, an acrylate, a polyolefin, an epoxy resin, a cyanate ester resin, a phenolic resin, a styrene maleic anhydride, a polyester resin, an amine curing agent, a polyamide resin, a polyimide resin or a combination thereof.

For example, in one embodiment, the polyolefin comprises a styrene-butadiene copolymer, a hydrogenated styrene-butadiene copolymer, a polybutadiene, a styrene-butadiene-divinylbenzene terpolymer, a styrene-butadiene-maleic anhydride terpolymer, a maleic anhydride-butadiene copolymer or a combination thereof.

For example, in one embodiment, the polyolefin comprises an epoxy-containing polybutadiene.

The amount of the crosslinking agent is not particularly limited. For example, in one embodiment, the resin composition comprises 1 to 25 parts by weight of the crosslinking agent. For example, in one embodiment, the resin composition comprises 1 to 25 parts by weight of the epoxy-containing polybutadiene. In another embodiment, the resin composition comprises 5 to 20 parts by weight of the epoxy-containing polybutadiene.

In addition to the aforesaid components or ingredients, the resin composition disclosed herein may also further optionally comprise: flame retardant, inorganic filler, curing accelerator, polymerization inhibitor, solvent, silane coupling agent, coloring agent, toughening agent or a combination thereof, but not limited thereto.

Another main object of the present disclosure is to provide an article made from the aforesaid resin composition, comprising a prepreg, a resin film, a laminate or a printed circuit board.

In one embodiment, articles made from the resin composition disclosed herein have one, more or all of the following properties:
- a copper foil peeling strength as measured by reference to IPC-TM-650 2.4.8 of greater than or equal to 3.0 lb/in;
- a dissipation factor as measured by reference to JIS C2565 at 10 GHz of less than or equal to 0.0090;
- a glass transition temperature as measured by reference to IPC-TM-650 2.4.24.5 of greater than or equal to 260° C.; and
- a ratio of thermal expansion as measured by reference to IPC-TM-650 2.4.24.5 of less than or equal to 0.5%.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

As used herein, a prepolymer refers to a product, derived from a compound or a mixture (monomer) that is subjected to prepolymerization (partial polymerization), contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solvent and heating or by a thermal melting reaction, but not limited thereto. For example, prepolymerization by the use of solvent and heating refers to dissolving the raw material in a solvent, optionally adding a catalyst or a polymerization inhibitor, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

As used herein, "vinyl" or "vinyl-containing" refers to the presence of an ethylenic carbon-carbon double bond (C═C) or a functional group derived therefrom in a compound. Therefore, examples of "vinyl" or "vinyl-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl-containing polyphenylene ether resin represents a polyphenylene ether resin containing a vinyl group, an allyl group, a vinylbenzyl group, a methacrylate group or the like, but not limited thereto.

As used herein, part(s) by weight represents weight part(s) in any weight unit, such as but not limited to kilogram, gram, pound and so on. For example, 100 parts by weight of the first prepolymer may represent 100 kilograms of the first prepolymer or 100 pounds of the first prepolymer.

The following embodiments and examples are illustrative in nature and are not intended to limit the present disclosure and its application. In addition, the present disclosure is not bound by any theory described in the background and summary above or the following embodiments or examples.

As described above, a primary object of the present disclosure is to provide a resin composition comprising a first prepolymer and a second prepolymer, the first prepolymer being prepared from a first mixture subjected to a prepolymerization reaction, the second prepolymer being prepared from a second mixture subjected to a prepolymerization reaction, wherein the first mixture comprises a maleimide resin and a benzoxazine resin, and the second mixture comprises a maleimide resin and a bis(trifluoromethyl) benzidine.

For example, in one embodiment, the maleimide resin contained in the first mixture and the maleimide resin contained in the second mixture may be the same or different. For example, in the present disclosure, unless otherwise specified, the term "maleimide resin" is construed to encompass a maleimide monomer, a maleimide polymer, a combination of maleimide monomers, a combination of maleimide polymers, and a combination of maleimide monomer(s) and maleimide polymer(s). For example, the maleimide resin refers to a compound, monomer, mixture, or polymer (including oligomer) containing at least one maleimide group. Unless otherwise specified, the maleimide resin used in the present disclosure is not particularly limited and may include any one or more maleimide resins useful for making a prepreg, a resin film, a laminate or a printed circuit board. Examples include but are not limited to 4,4'-diphenylmethane bismaleimide, oligomer of phenylmethane maleimide (a.k.a. polyphenylmethane maleimide), bismaleimide toluene, diethylbismaleimide toluene, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylyl maleimide, N-2,6-xylylmaleimide, N-phenyl maleimide, a maleimide resin containing aliphatic long-chain structure, or a combination thereof. Preferably, the maleimide resin is a maleimide resin containing aliphatic long-chain structure. In addition, unless otherwise specified, the aforesaid maleimide resin of the present disclosure may comprise a prepolymer thereof, such as a prepolymer of diallyl compound and maleimide compound, a prepolymer of diamine and maleimide compound, a prepolymer of multi-functional amine and maleimide compound or a prepolymer of acid phenol compound and maleimide compound, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000, BMI-4000H, BMI-5000, BMI-5100, BM-7000 and BMI-7000H available from Daiwakasei Co., Ltd., products such as BMI-70 and BMI-80 available from K.I Chemical Industry Co., Ltd., or products such as Compimide MDAB, Compimide TDAB, and Compimide DE-TDAB available from Evonik Industries.

For example, the maleimide resin containing aliphatic long-chain structure may include products such as BMI-689, BMI-1400, BMI-1500, BMI-1700, BMI-2500, BMI-3000, BMI-3000J, BMI-3000G, BMI-3000GE, BMI-5000 and BMI-6000 available from Designer Molecules Inc.

Unless otherwise specified, the benzoxazine resin used in the present disclosure is not particularly limited and may include any one or more benzoxazine resins useful for making a prepreg, a resin film, a laminate or a printed circuit board. For example, the benzoxazine resin may have a structure of Formula (1), Formula (2), Formula (3) or a combination thereof:

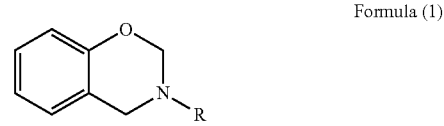

Formula (1)

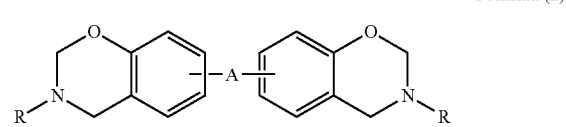

Formula (2)

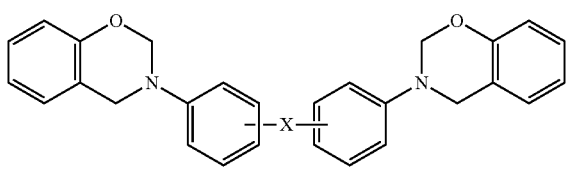

Formula (3)

wherein R is selected from a hydrogen atom and a $C_1$-$C_6$ substituted or unsubstituted linear or cyclic hydrocarbon group, R preferably being an aromatic hydrocarbon group and more preferably being a phenyl group; A is selected from a covalent bond, —$CH_2$—, —CH($CH_3$)—, —C($CH_3$)$_2$—, —O—, —S—, —$SO_2$—, bisphenol A, bisphenol F, dicyclopentadienyl, oxydianiline group, phenolphthalein group and carbonyl group; and X is selected from a covalent bond, —$CH_2$—, —CH($CH_3$)—, —C($CH_3$)$_2$—, —O—, —S—, —$SO_2$—, bisphenol A, bisphenol F, dicyclopentadienyl, oxydianiline group, phenolphthalein group and carbonyl group.

For example, the benzoxazine resin includes, but not limited to, bisphenol A benzoxazine resin, bisphenol F benzoxazine resin, phenolphthalein benzoxazine resin, dicyclopentadiene benzoxazine resin, phosphorus-containing benzoxazine resin, oxydianiline benzoxazine resin, or unsaturated bond-containing benzoxazine resin, such as but not limited to LZ-8270, LZ-8280, LZ-8290 or LZ-8298 available from Huntsman, P-d and F-a available from Shikoku Chemicals, PF-3500 available from Chang Chun Plastics, HFB-2006M available from Showa High Polymer, or KZH-5031 available from Kolon Industries Inc.

Unless otherwise specified, with the proviso that the second prepolymer may be formed, the bis(trifluoromethyl)benzidine disclosed herein may be any one or more isomers thereof, including but not limited to 2,2'-bis(trifluoromethyl)benzidine (a.k.a. 4,4'-diamino-2,2'-bis(trifluoromethyl)biphenyl).

In the present disclosure, the first prepolymer is prepared from a first mixture subjected to a prepolymerization reaction, and the first mixture comprises a maleimide resin and a benzoxazine resin. In one embodiment, the weight average molecular weight of the first prepolymer is not particularly limited, preferably being 900 to 3000, more preferably being 1000 to 2500.

For example, the first mixture containing a maleimide resin and a benzoxazine resin may be subjected to a prepolymerization reaction under any proper conditions so as to form the first prepolymer. In one embodiment, a process for preparing the first prepolymer includes dissolving a maleimide resin in a solvent, adding a benzoxazine resin and stirring and mixing until fully dissolved, followed by reacting for 2 to 8 hours at high temperature (such as 50° C. to 150° C.), so as to obtain the first prepolymer, which is a prepolymer of maleimide resin and benzoxazine resin. In another embodiment, a process for preparing the first prepolymer includes heating a maleimide resin and a benzoxazine resin to a temperature ranging from 180° C. to 400° C. to perform melting and mixing for 10 to 1000 seconds, preferably 10 to 600 seconds, so as to obtain the first prepolymer, which is a prepolymer of maleimide resin and benzoxazine resin.

During the process of preparing the first prepolymer by subjecting the first mixture to a prepolymerization reaction, the amount or ratio of maleimide resin and benzoxazine resin contained in the first mixture is not particularly limited and may contain any amount or ratio suitable for forming the first prepolymer. For example, relative to 100 parts by weight of the maleimide resin, 1 to 100 parts by weight of the benzoxazine resin may be used; relative to 100 parts by weight of the maleimide resin, 10 to 50 parts by weight of the benzoxazine resin may be used; or relative to 100 parts by weight of the maleimide resin, 10 to 30 parts by weight of the benzoxazine resin may be used, but not limited thereto.

On the other hand, during the process of preparing the first prepolymer by subjecting the first mixture to a prepolymerization reaction, the first mixture may further comprise a first prepolymerization additive in addition to the maleimide resin and the benzoxazine resin. Examples of the first prepolymerization additive include vinyl-containing polyphenylene ether resin, small molecule vinyl compound, acrylate, epoxy resin, cyanate ester resin, phenolic resin or a combination thereof. The amount of the first prepolymerization additive is not particularly limited. For example, relative to 100 parts by weight of the maleimide resin, 0.5 to 100 parts by weight of the first prepolymerization additive may be used; or relative to 100 parts by weight of the maleimide resin, 0.5 to 50 parts by weight of the first prepolymerization additive may be used, but not limited thereto. For example, relative to 100 parts by weight of the maleimide resin, 0.5 to 50 parts by weight of epoxy resin may be used. For example, relative to 100 parts by weight of the maleimide resin, 15 parts by weight of epoxy resin and 45 parts by weight of acrylate may be used.

In another aspect, during the process of preparing the first prepolymer by subjecting the first mixture to a prepolymerization reaction, the first mixture may further comprise, in addition to the maleimide resin and the benzoxazine resin, a curing accelerator, a polymerization inhibitor or a solvent, in order to control the degree of the prepolymerization reaction or the reactivity of the first prepolymer. The amount of curing accelerator, polymerization inhibitor or solvent is not particularly limited and may be determined by a person having ordinary skill in the art according to the reaction degree needed.

In the present disclosure, the second prepolymer is prepared from a second mixture subjected to a prepolymerization reaction, and the second mixture comprises a maleimide resin and a bis(trifluoromethyl)benzidine. In one embodiment, the weight average molecular weight of the second prepolymer is not particularly limited, preferably being 750 to 3000, more preferably being 900 to 2500.

For example, the second mixture containing a maleimide resin and a bis(trifluoromethyl)benzidine may be subjected to a prepolymerization reaction under any proper conditions so as to form the second prepolymer. In one embodiment, a process for preparing the second prepolymer includes heating to melt a maleimide resin to a liquid state, adding a bis(trifluoromethyl)benzidine, reacting at 50° C. to 200° C. for 1 to 6 hours, followed by adding a solvent after the reaction is completed and well-stirring, so as to obtain the second prepolymer, which is a prepolymer of maleimide resin and bis(trifluoromethyl)benzidine. In another embodiment, a process for preparing the second prepolymer includes dissolving a maleimide resin in a solvent, adding a bis(trifluoromethyl)benzidine and stirring and mixing until fully dissolved, followed by reacting for 2 to 8 hours at high temperature (such as 50° C. to 150° C.), so as to obtain the second prepolymer, which is a prepolymer of maleimide resin and bis(trifluoromethyl)benzidine.

During the process of preparing the second prepolymer by subjecting the second mixture to a prepolymerization reaction, the amount or ratio of maleimide resin and bis(trifluoromethyl)benzidine contained in the second mixture is not particularly limited and may contain any amount or ratio suitable for forming the second prepolymer. For example, relative to 100 parts by weight of the maleimide resin, 1 to 50 parts by weight of the bis(trifluoromethyl)benzidine may be used; relative to 100 parts by weight of the maleimide resin, 5 to 40 parts by weight of the bis(trifluoromethyl)benzidine may be used; or relative to 100 parts by weight of the maleimide resin, 7.5 to 30 parts by weight of the bis(trifluoromethyl)benzidine may be used, but not limited thereto.

In another embodiment, during the process of preparing the second prepolymer by subjecting the second mixture to a prepolymerization reaction, the amount of vinyl group contained in the maleimide resin and the amount of amino group contained in the bis(trifluoromethyl)benzidine are not particularly limited, and any ratio therebetween suitable for forming the second prepolymer is applicable to the present disclosure. For example, in the second mixture, a ratio of an equivalent of vinyl group of the maleimide resin and an equivalent of amino group of the bis(trifluoromethyl)benzidine may be 0.5:1 to 10:1, such as 1:1 to 5:1.

On the other hand, during the process of preparing the second prepolymer by subjecting the second mixture to a prepolymerization reaction, the second mixture may further comprise a second prepolymerization additive in addition to the maleimide resin and the bis(trifluoromethyl)benzidine. Examples of the second prepolymerization additive include vinyl-containing polyphenylene ether resin, small molecule vinyl compound, acrylate, polyolefin or a combination thereof. The amount of the second prepolymerization additive is not particularly limited. For example, relative to 100 parts by weight of the maleimide resin, 0.5 to 100 parts by weight of the second prepolymerization additive may be used; relative to 100 parts by weight of the maleimide resin, 0.5 to 80 parts by weight of the second prepolymerization additive may be used; or relative to 100 parts by weight of the maleimide resin, 0.5 to 50 parts by weight of the second prepolymerization additive may be used, but not limited thereto. For example, relative to 100 parts by weight of the maleimide resin, 0.5 to 50 parts by weight of acrylate may be used. For example, relative to 100 parts by weight of the maleimide resin, 15 parts by weight of diallyl bisphenol A and 45 parts by weight of acrylate may be used.

In another aspect, during the process of preparing the second prepolymer by subjecting the second mixture to a prepolymerization reaction, the second mixture may further comprise, in addition to the maleimide resin and the bis(trifluoromethyl) benzidine, a curing accelerator, a polymerization inhibitor or a solvent, in order to control the degree of the prepolymerization reaction or the reactivity of the second prepolymer. The amount of curing accelerator, polymerization inhibitor or solvent is not particularly limited and may be determined by a person having ordinary skill in the art according to the reaction degree needed.

In the resin composition disclosed herein, the amount or ratio of the first prepolymer and the second prepolymer is not particularly limited. For example, relative to 100 parts by weight of the first prepolymer, the resin composition disclosed herein may comprise 1 to 100 parts by weight of the second prepolymer, 3 to 50 parts by weight of the second prepolymer or 8 to 35 parts by weight of the second prepolymer, but not limited thereto.

In addition to the aforesaid first prepolymer and second prepolymer, the resin composition disclosed herein may optionally further comprise other components. For example, in one embodiment, the resin composition according to the present disclosure may further optionally comprise a crosslinking agent. For example, a suitable crosslinking agent may comprise, but not limited to: a maleimide resin, a vinyl-containing polyphenylene ether resin, a small molecule vinyl compound, an acrylate, a polyolefin, an epoxy resin, a cyanate ester resin, a phenolic resin, a styrene maleic anhydride, a polyester resin, an amine curing agent, a polyamide resin, a polyimide resin or a combination thereof. Unless otherwise specified, in the resin composition, intermolecular covalent bonds may be formed by the crosslinking agent with the same or different compounds (including prepolymer, polymer, etc.), such that the resin composition may be subjected to a crosslinking reaction under proper conditions to form a more stable structure.

In one embodiment, the amount of the crosslinking agent is not particularly limited. For example, relative to 100 parts by weight of the first prepolymer, 0.5 to 100 parts by weight of the crosslinking agent may be used; relative to 100 parts by weight of the first prepolymer, 0.5 to 80 parts by weight of the crosslinking agent may be used; relative to 100 parts by weight of the first prepolymer, 0.5 to 50 parts by weight of the crosslinking agent may be used; relative to 100 parts by weight of the first prepolymer, 1 to 35 parts by weight of the crosslinking agent may be used; or relative to 100 parts by weight of the first prepolymer, 5 to 20 parts by weight of the crosslinking agent may be used, but not limited thereto.

Unless otherwise specified, the aforesaid maleimide resin further added to the resin composition disclosed herein is different from the maleimide resin used to form the first prepolymer or the second prepolymer; instead, the aforesaid maleimide resin further added is another maleimide resin other than the one used in the first prepolymer or the second prepolymer, and examples and embodiments thereof are as described above.

As used herein, the vinyl-containing polyphenylene ether resin represents a polyphenylene ether resin containing a vinyl group, examples including but not limited to a polyphenylene ether resin containing a vinyl group, an allyl group, a vinylbenzyl group, or a methacrylate group. For example, in one embodiment, the vinyl-containing polyphenylene ether resin comprises a vinylbenzyl-containing polyphenylene ether resin, a methacrylate-containing polyphenylene ether resin (i.e., methacryloyl-containing polyphenylene ether resin), an allyl-containing polyphenylene ether resin, a vinylbenzyl-modified bisphenol A polyphenylene ether resin, a chain-extended vinyl-containing polyphenylene ether resin or a combination thereof. For example, the vinyl-containing polyphenylene ether resin may be a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, the small molecule vinyl compound as used herein refers to a vinyl-containing compound with a molecular weight of less than or equal to 1000, preferably between 100 and 900 and more preferably between 100 and 800. According to the present disclosure, the small molecule vinyl compound may include, but not limited to, divinylbenzene (DVB), bis(vinylbenzyl) ether (BVBE), triallyl isocyanurate (TAIC), triallyl cyanurate (TAC), 1,2,4-trivinyl cyclohexane (TVCH), diallyl isophthalate (DAIP), diallyl bisphenol A (DABPA) or a combination thereof.

For example, the acrylate may include, but not limited to, tricyclodecane di(meth)acrylate, tri(meth)acrylate, 1,1'-[(octahydro-4,7-methano-1H-indene-5,6-diyl) bis(methylene)] ester (e.g., SR-833S, available from Sartomer) or a combination thereof.

For example, examples of the polyolefin include but are not limited to styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer (a.k.a. styrene-ethylene-butene-styrene block polymer), styrene-isoprene copolymer, hydrogenated styrene-isoprene copolymer, hydrogenated styrene-butadiene-divinylbenzene terpolymer, polybutadiene (homopolymer of butadiene), maleic anhydride-butadiene copolymer, methyl styrene copolymer or a combination thereof. Preferably, the polyolefin comprises styrene-butadiene copolymer, hydrogenated styrene-butadiene copolymer, polybutadiene, styrene-butadiene-maleic anhydride terpolymer, maleic anhydride-butadiene copolymer, or a combination thereof. For example, the polybutadiene may comprise a polybutadiene without any reactive group, a hydrogenated polybutadiene, a hydroxyl-containing polybutadiene, a phenolic hydroxyl-containing polybutadiene (having a polybutadiene structure and containing a phenolic hydroxyl group), a carboxyl-containing polybutadiene, an anhydride-containing polybutadiene, an epoxy-containing polybutadiene, an isocyanate-containing polybutadiene, an urethane-containing polybutadiene, a hydrogenated polybutadiene with its terminal hydroxyl groups modified by vinyl groups (therefore without any hydroxyl group) or a combination thereof. For example, the polybutadiene may comprise an epoxy-containing polybutadiene.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetra-functional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin or naphthalene ether epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9, 10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin may include any one or more cyanate ester resins useful for preparing a prepreg, a resin film, a laminate or a printed circuit board, such as a compound having an Ar—O—C≡N structure, wherein Ar may be a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be phenol novolac cyanate ester resin, bisphenol A novolac cyanate ester resin, bisphenol F novolac cyanate ester resin or a combination thereof. For example, the cyanate ester resin may be available under the tradename Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza.

For example, the phenolic resin may comprise but not limited to mono-functional, bifunctional or multifunctional phenolic resin, comprising phenolic resin of a resin composition conventionally used for making prepregs, such as phenoxy resin, novolac resin, etc.

For example, in the styrene maleic anhydride, the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope.

For example, the polyester resin may be prepared by esterification of dicarboxylic aromatic compounds with dihydroxyl aromatic compounds. Examples of the polyester resin include, but not limited to, HPC-8000, HPC-8150 or HPC-8200 available from D.I.C. Corporation.

For example, the amine curing agent may include, but not limited to, any one or a combination of diamino diphenyl sulfone, diamino diphenyl methane, diamino diphenyl ether, diamino diphenyl sulfide and dicyandiamide.

For example, the polyamide resin may be any polyamide resin known in the field to which this disclosure pertains, including but not limited to various commercially available polyamide resin products.

For example, the polyimide resin may be any polyimide resin known in the field to which this disclosure pertains, including but not limited to various commercially available polyimide resin products.

In addition to the first prepolymer and the second prepolymer, the resin composition disclosed herein may also further optionally comprise: flame retardant, inorganic filler, curing accelerator, polymerization inhibitor, solvent, silane coupling agent, coloring agent, toughening agent or a combination thereof.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac).

For example, the inorganic filler may be any one or more inorganic fillers used for preparing a prepreg, a resin film, a laminate or a printed circuit board; examples of the inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like in shape and can be optionally pretreated by a silane coupling agent.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne peroxide (25B), bis(tert-butylperoxyisopropyl)benzene or a combination thereof.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxopiperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent is not particularly limited and may be any solvent suitable for dissolving the resin composition disclosed herein, example including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg may be for example 80° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 260° C. and preferably between 200° C. and 240° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: copper foil peeling strength, dissipation factor, ratio of thermal expansion, cure shrinkage and glass transition temperature.

For example, the resin composition according to the present disclosure or the article made therefrom may achieve one, more or all of the following properties:

- a copper foil peeling strength as measured by reference to IPC-TM-650 2.4.8 of greater than or equal to 3.0 lb/in, such as greater than or equal to 3.1 lb/in or greater than or equal to 3.5 lb/in, such as between 3.0 lb/in and 4.7 lb/in, between 3.5 lb/in and 4.5 lb/in or between 3.5 lb/in and 4.2 lb/in;
- a dissipation factor as measured by reference to JIS C2565 at 10 GHz of less than or equal to 0.0090, such as less than or equal to 0.0085, such as between 0.0060 and 0.0090, between 0.0066 and 0.0090, between 0.0066 and 0.0085 or between 0.0068 and 0.0085;
- a ratio of thermal expansion as measured by reference to IPC-TM-650 2.4.24.5 of less than or equal to 0.50%, such as less than or equal to 0.47%, less than or equal to 0.45%, less than or equal to 0.40%, less than or equal to 0.35%, less than or equal to 0.30%, less than or equal to 0.25%, or less than or equal to 0.20%, such as between 0.20% and 0.50%, between 0.20% and 0.47% or between 0.20% and 0.42%;
- a cure shrinkage as measured by thermomechanical analysis of less than or equal to 3.00 μm, such as less than or equal to 0.80 μm, less than or equal to 0.79 μm, less than or equal to 0.60 μm, or less than or equal to 0.40 μm, such as between 0.20 and 3.00, between 0.21 and 1.50, between 0.21 and 0.79, between 0.21 and 0.59, or between 0.21 and 0.39; and
- a glass transition temperature as measured by reference to IPC-TM-650 2.4.24.5 of greater than or equal to 260° C., such as greater than or equal to 270° C., greater than or equal to 280° C. or greater than or equal to 290° C., such as between 260° C. and 300° C., between 260° C. and 293° C., or between 276° C. and 289° C.

Raw materials below were used to prepare the resin compositions of various Examples and Comparative Examples of the present disclosure according to the amount listed in Table 1 to Table 5 and further fabricated to prepare test samples.

Materials and reagents used in Examples and Comparative Examples disclosed herein are listed below:

- BMI-2300: polyphenylmethane maleimide, available from Daiwakasei Industry Co., Ltd.
- P-d: bisphenol F type benzoxazine resin, i.e., Formula (3) with X being —$CH_2$—, available from Shikoku Chemicals Corp.
- LZ-8270: phenolphthalein type benzoxazine resin, available from Huntsman.
- NC-3000H: biphenyl novolac epoxy resin, available from Nippon Kayaku. 2PZ: 2-phenylimidazole, available from Shikoku Chemicals Corp.
- BMI-70: 3,3'-dimethyl-5,5'-diethyl-4,4'-diphenylmethane bismaleimide, available from K.I Chemical Industry Co., Ltd.
- PF-3500: oxydianiline type benzoxazine resin, available from Chang Chun Plastics.
- HP-6000: naphthalene ether type epoxy resin, available from DIC Corporation.
- VG3101L: trifunctional epoxy resin, available from Printec Co.
- BA230S: cyanate ester resin, available from Lonza.
- cobaltic acetyl acetonate: available from Sigma-Aldrich.
- DABPA: diallyl bisphenol A, available from Daiwakasei Industry Co., Ltd.
- TFMB: 4,4'-diamino-2,2'-bis(trifluoromethyl)biphenyl, available from Sigma-Aldrich.
- BMI-80: 2,2'-bis-[4-(4-maleimidephenoxy)phenyl]propane, available from K.I Chemical Industry Co., Ltd.
- DAIP: diallyl isophthalate, available from Chembridge International Corp., Ltd.
- BMI-TMH: 1,6-bismaleimido-(2,2,4-trimethyl)hexane, available from Daiwakasei Industry Co., Ltd.
- Mosacure 310: 4,4'-methylene bis(2,6-diethylaniline), available from UFC Corp.
- DDS: diamino diphenyl sulfone, available from Kingyorker Enterprise Co., Ltd.
- OPE-2st 1200: bis(vinylbenzyl)-terminated polyphenylene ether resin with a number average molecular weight (Mn) of about 1200, available from Mitsubishi Gas Chemical Co., Inc.
- JP-100: epoxy-terminated polybutadiene resin, available from Nippon Soda Co., Ltd. Ricon 184MA6: styrene-butadiene-maleic anhydride terpolymer, available from Cray Valley.
- D1155E: styrene-butadiene copolymer (SBS), available from Kraton Polymers.
- SC-2500-SMJ: spherical silica with surface pre-treated by methacrylate silane coupling agent, available from Admatechs.
- 25B: 2,5-dimethyl-2,5-di(t-butylperoxy)-3-hexyne, available from NOF Corporation.
- methyl ethyl ketone: MEK, source not limited.
- dimethylacetamide: DMAC, source not limited.

The amount of methyl ethyl ketone or dimethylacetamide is shown as "PA" in the Tables to indicate a "proper amount" to represent an amount of solvent used to achieve a 80 wt % solid content of the whole resin composition; if the resin composition comprises both methyl ethyl ketone and dimethylacetamide, "PA" represents the total amount of both solvents used to achieve a 80 wt % solid content of the whole resin composition.

Preparation Example 1

To 185 parts by weight of methyl ethyl ketone, 100 parts by weight of maleimide resin BMI-2300 were added and dissolved, followed by adding 30 parts by weight of benzoxazine resin P-d, mixing and stirring. After fully dissolved, the solution was mixed and stirred at 100° C. for 4 hours to obtain the first prepolymer 1, which is a prepolymer of maleimide resin and benzoxazine resin.

Preparation Example 2

To 200 parts by weight of methyl ethyl ketone, 100 parts by weight of maleimide resin BMI-2300 were added and dissolved, followed by adding 10 parts by weight of benzoxazine resin LZ-8270 and then 15 parts by weight of epoxy resin NC-3000H, mixing and stirring. After fully dissolved, the solution was added with 0.45 part by weight of catalyst 2PZ at 100° C. and mixed and stirred for 4 hours to obtain the first prepolymer 2, which is a prepolymer of maleimide resin, benzoxazine resin and epoxy resin.

Preparation Example 3

To 200 parts by weight of methyl ethyl ketone, 100 parts by weight of maleimide resin BMI-70 were added and dissolved, followed by adding 20 parts by weight of benzoxazine resin PF-3500 and then 45 parts by weight of epoxy resin HP-6000, mixing and stirring. After fully dissolved, the solution was added with 0.25 part by weight of catalyst 2PZ and mixed and stirred at 100° C. for 4 hours to obtain the first prepolymer 3, which is a prepolymer of maleimide resin, benzoxazine resin and epoxy resin.

Preparation Example 4

A mixture of 100 parts by weight of maleimide resin BMI-2300, 30 parts by weight of benzoxazine resin P-d and 15 parts by weight of epoxy resin VG3101L was heated on a heater plate to 230° C. (melting temperature ranging from 185° C. to 250° C.) for melting and mixing for 90 seconds, so as to obtain the first prepolymer 4, which is a prepolymer of maleimide resin, benzoxazine resin and epoxy resin.

Preparation Example 5

50 parts by weight of cyanate ester resin BA230S and 50 parts by weight of maleimide resin BMI-2300 were melted and stirred at 150° C., followed by adding 0.5 part by weight of cobaltic acetylacetonate and 1 part by weight of DABPA. After reaction under stirring for 1 hour, the product was dissolved in methyl ethyl ketone to form a prepolymer of maleimide resin and cyanate ester resin.

Preparation Example 6

100 parts by weight of maleimide resin BMI-2300 was melted to liquid state at 120° C. and then loaded to a reaction tank and mixed and reacted with 15 parts by weight of bis(trifluoromethyl)benzidine TFMB at 90° C. for 3 hours. After the reaction was completed, 40 parts by weight of methyl ethyl ketone was added to the reaction tank and well-stirred to obtain the second prepolymer 1, which is a prepolymer of maleimide resin and bis(trifluoromethyl)benzidine, wherein the ratio of an equivalent of vinyl group of maleimide resin and an equivalent of amino group of bis(trifluoromethyl)benzidine is 2.98:1.

Preparation Example 7

100 parts by weight of maleimide resin BMI-80 and 20 parts by weight of diallyl isophthalate DAIP were melted to liquid state at 120° C. and then loaded to a reaction tank and mixed and reacted with 7.5 parts by weight of bis(trifluoromethyl)benzidine TFMB at 90° C. for 3 hours. After the reaction was completed, 40 parts by weight of methyl ethyl ketone was added to the reaction tank and well-stirred to obtain the second prepolymer 2, which is a prepolymer of maleimide resin, diallyl isophthalate and bis(trifluoromethyl)benzidine, wherein the ratio of an equivalent of vinyl group of maleimide resin and an equivalent of amino group of bis(trifluoromethyl)benzidine is 3.74:1, and the ratio of an equivalent of vinyl group of maleimide resin and an equivalent of vinyl group of diallyl isophthalate is 2.16:1.

Preparation Example 8

100 parts by weight of maleimide resin BMI-TMH, 10 parts by weight of diallyl isophthalate DAIP and 20 parts by weight of diallyl bisphenol A DABPA were melted to liquid state at 120° C. and then loaded to a reaction tank and mixed and reacted with 30 parts by weight of bis(trifluoromethyl)benzidine TFMB at 90° C. for 3 hours. After the reaction was completed, 40 parts by weight of methyl ethyl ketone was added to the reaction tank and well-stirred to obtain the second prepolymer 3, which is a prepolymer of maleimide resin, diallyl isophthalate, diallyl bisphenol A and bis(trifluoromethyl)benzidine, wherein the ratio of an equivalent of vinyl group of maleimide resin and an equivalent of amino group of bis(trifluoromethyl)benzidine is 1.68:1, and the ratio of an equivalent of vinyl group of maleimide resin and a total equivalent of vinyl groups of both diallyl isophthalate and diallyl bisphenol A is 2.98:1.

Preparation Example 9

100 parts by weight of maleimide resin BMI-2300 was melted to liquid state at 120° C. and then loaded to a reaction tank and mixed and reacted with 15 parts by weight of aniline compound Mosacure 310 at 90° C. for 3 hours. After the reaction was completed, 40 parts by weight of methyl ethyl ketone was added to the reaction tank and well-stirred to obtain a prepolymer of maleimide resin and aniline compound.

Preparation Example 10

100 parts by weight of maleimide resin BMI-80 was melted to liquid state at 120° C. and then loaded to a reaction tank and mixed and reacted with 15 parts by weight of diamino diphenyl sulfone DDS at 90° C. for 3 hours. After the reaction was completed, 40 parts by weight of methyl ethyl ketone was added to the reaction tank and well-stirred to obtain a prepolymer of maleimide resin and diamino diphenyl sulfone.

Preparation Example 11

To 150 parts by weight of dimethylacetamide, 100 parts by weight of maleimide resin BMI-2300 were added and dissolved, followed by adding 15 parts by weight of bis (trifluoromethyl)benzidine TFMB, mixing and stirring. After fully dissolved, the solution was mixed and stirred at 90° C. for 3 hours to obtain the second prepolymer 4, which is a prepolymer of maleimide resin and bis(trifluoromethyl) benzidine, wherein the ratio of an equivalent of vinyl group of maleimide resin and an equivalent of amino group of bis(trifluoromethyl)benzidine is 2.98:1.

Compositions and test results of resin compositions of Examples and Comparative Examples are listed below (in part by weight):

TABLE 1

Resin compositions of Examples (in part by weight) and test results

| | Component | E1 | E2 | E3 | E4 | E5 | E6 | E7 |
|---|---|---|---|---|---|---|---|---|
| first prepolymer | first prepolymer 1 | 100 | 100 | 100 | | 85 | | 100 |
| | first prepolymer 2 | | | | 100 | | | |
| | first prepolymer 3 | | | | | 15 | | |
| | first prepolymer 4 | | | | | | 100 | |
| prepolymer | prepolymer of maleimide resin and cyanate ester resin | | | | | | | |

TABLE 1-continued

Resin compositions of Examples (in part by weight) and test results

| | | | | | | | | |
|---|---|---|---|---|---|---|---|---|
| second prepolymer | second prepolymer 1 | 25 | | | 25 | 25 | 25 | 35 |
| | second prepolymer 2 | | 25 | | | | | |
| | second prepolymer 3 | | | 25 | | | | |
| prepolymer | prepolymer of maleimide resin and aniline compound | | | | | | | |
| | prepolymer of maleimide resin and diamino diphenyl sulfone | | | | | | | |
| polyphenylene ether resin | OPE-2st 1200 | | | | | | | |
| maleimide resin | BMI-2300 | | | | | | | |
| | BMI-70 | | | | | | | |
| bis(trifluoromethyl) benzidine | TFMB | | | | | | | |
| benzoxazine resin | P-d | | | | | | | |
| | PF-3500 | | | | | | | |
| epoxy resin | HP-6000 | | | | | | | |
| polyolefin | JP-100 | | | | | | | |
| | Ricon184MA6 | | | | | | | |
| | D1155E | | | | | | | |
| inorganic filler | SC-2500-SMJ | 250 | 250 | 250 | 250 | 250 | 250 | 250 |
| catalyst | 25B | 0.5 | 0.5 | 0.5 | 0.5 | 0.5 | 0.5 | 0.5 |
| solvent | MEK | PA | PA | PA | PA | PA | PA | PA |
| | DMAC | | | | | | | |

| Property | Unit | E1 | E2 | E3 | E4 | E5 | E6 | E7 |
|---|---|---|---|---|---|---|---|---|
| copper foil peeling strength | lb/in | 4.3 | 4.4 | 4.3 | 4.5 | 4.4 | 4.5 | 3.5 |
| dissipation factor | none | 0.0076 | 0.0069 | 0.0068 | 0.0080 | 0.0081 | 0.0077 | 0.0071 |
| glass transition temperature | °C. | 286 | 275 | 260 | 289 | 276 | 275 | 282 |
| ratio of thermal expansion | % | 0.26 | 0.42 | 0.41 | 0.34 | 0.38 | 0.39 | 0.33 |
| cure shrinkage | μm | 0.67 | 0.69 | 0.71 | 0.68 | 0.66 | 0.64 | 0.63 |

TABLE 2

Resin compositions of Examples (in part by weight) and test results

| Component | | E8 | E9 | E10 | E11 | E12 | E13 | E14 |
|---|---|---|---|---|---|---|---|---|
| first prepolymer | first prepolymer 1 | 100 | 100 | 100 | 100 | 100 | 100 | 100 |
| | first prepolymer 2 | | | | | | | |
| | first prepolymer 3 | | | | | | | |
| | first prepolymer 4 | | | | | | | |
| prepolymer | prepolymer of maleimide resin and cyanate ester resin | | | | | | | |
| second prepolymer | second prepolymer 1 | 8 | 50 | 3 | 25 | 25 | 25 | 25 |
| | second prepolymer 2 | | | | | | | |
| | second prepolymer 3 | | | | | | | |
| prepolymer | prepolymer of maleimide resin and aniline compound | | | | | | | |
| | prepolymer of maleimide resin and diamino diphenyl sulfone | | | | | | | |
| polyphenylene ether resin | OPE-2st 1200 | | | | | | | |
| maleimide resin | BMI-2300 | | | | | 10 | | |
| | BMI-70 | | | | | | | |
| bis(trifluoromethyl) benzidine | TFMB | | | | | | | |
| benzoxazine resin | P-d | | | | | | | |
| | PF-3500 | | | | | | | |
| epoxy resin | HP-6000 | | | | | | | |
| polyolefin | JP-100 | | | | | | | 15 |
| | Ricon184MA6 | | | | | | 15 | |
| | D1155E | | | | | 15 | | |

TABLE 2-continued

Resin compositions of Examples (in part by weight) and test results

| | | | | | | | | |
|---|---|---|---|---|---|---|---|---|
| inorganic filler | SC-2500-SMJ | 250 | 250 | 250 | 250 | 250 | 250 | 250 |
| catalyst | 25B | 0.5 | 0.5 | 0.5 | 0.5 | 0.5 | 0.5 | 0.5 |
| solvent | MEK | | | | | | | |
| | PA | PA | PA | PA | PA | PA | PA | |
| | DMAC | | | | | | | |

| Property | Unit | E8 | E9 | E10 | E11 | E12 | E13 | E14 |
|---|---|---|---|---|---|---|---|---|
| copper foil peeling strength | lb/in | 4.4 | 3.1 | 4.5 | 4.0 | 3.6 | 3.5 | 3.8 |
| dissipation factor | none | 0.0084 | 0.0066 | 0.0090 | 0.0077 | 0.0072 | 0.0068 | 0.0081 |
| glass transition temperature | °C. | 289 | 278 | 290 | 291 | 272 | 275 | 283 |
| ratio of thermal expansion | % | 0.32 | 0.35 | 0.42 | 0.20 | 0.46 | 0.47 | 0.26 |
| cure shrinkage | μm | 0.69 | 0.79 | 0.77 | 0.62 | 2.68 | 1.92 | 0.27 |

TABLE 3

Resin compositions of Examples (in part by weight) and test results

| | Component | E15 | E16 | E17 | E18 | E19 | E20 | E21 |
|---|---|---|---|---|---|---|---|---|
| first prepolymer | first prepolymer 1 | 100 | 100 | 100 | 100 | 53 | 100 | 100 |
| | first prepolymer 2 | | | | | 22 | | |
| | first prepolymer 3 | | | | | 8 | | |
| | first prepolymer 4 | | | | | 17 | | |
| prepolymer | prepolymer of maleimide resin and cyanate ester resin | | | | | | | |
| second prepolymer | second prepolymer 1 | 25 | 25 | 25 | 25 | 5 | 25 | 25 |
| | second prepolymer 2 | | | | | 6 | | |
| | second prepolymer 3 | | | | | 9 | | |
| prepolymer | prepolymer of maleimide resin and aniline compound | | | | | | | |
| | prepolymer of maleimide resin and diamino diphenyl sulfone | | | | | | | |
| polyphenylene ether resin | OPE-2st 1200 | | | | | 5 | | |
| maleimide resin | BMI-2300 | | | | | | | |
| | BMI-70 | | | | | | | |
| bis(trifluoromethyl) benzidine | TFMB | | | | | | | |
| benzoxazine resin | P-d | | | | | | | |
| | PF-3500 | | | | | | | |
| epoxy resin | HP-6000 | | | | | | | |
| polyolefin | JP-100 | 20 | 5 | 25 | 1 | 10 | | |
| | Ricon184MA6 | | | | | | | |
| | D1155E | | | | | | | |
| inorganic filler | SC-2500-SMJ | 250 | 250 | 250 | 250 | 250 | 310 | 200 |
| catalyst | 25B | 0.5 | 0.5 | 0.5 | 0.5 | 0.5 | 0.5 | 0.5 |
| solvent | MEK | | | | | | | |
| | PA | PA | PA | PA | PA | PA | PA | |
| | DMAC | | | | | | | |

| Property | Unit | E15 | E16 | E17 | E18 | E19 | E20 | E21 |
|---|---|---|---|---|---|---|---|---|
| copper foil peeling strength | lb/in | 3.7 | 4.1 | 3.5 | 4.2 | 4.1 | 3.8 | 4.4 |
| dissipation factor | none | 0.0083 | 0.0075 | 0.0085 | 0.0074 | 0.0068 | 0.0078 | 0.0073 |
| glass transition temperature | °C. | 281 | 287 | 276 | 289 | 279 | 284 | 293 |
| ratio of thermal expansion | % | 0.27 | 0.23 | 0.34 | 0.20 | 0.42 | 0.21 | 0.28 |
| cure shrinkage | μm | 0.21 | 0.39 | 0.42 | 0.59 | 0.22 | 0.72 | 1.40 |

TABLE 4

Resin compositions of Comparative Examples (in part by weight) and test results

| | Component | C1 | C2 | C3 | C4 | C5 |
|---|---|---|---|---|---|---|
| first prepolymer | first prepolymer 1 | | 100 | | | 100 |
| | first prepolymer 2 | | | | | |
| | first prepolymer 3 | | | | | |
| | first prepolymer 4 | | | | | |
| prepolymer | prepolymer of maleimide resin and cyanate ester resin | | | | | |
| second prepolymer | second prepolymer 1 | | | 25 | 25 | |
| | second prepolymer 2 | | | | | |
| | second prepolymer 3 | | | | | |
| prepolymer | prepolymer of maleimide resin and aniline compound | | | | | 25 |
| | prepolymer of maleimide resin and diamino diphenyl sulfone | | | | | |
| polyphenylene ether resin | OPE-2st 1200 | | | | | |
| maleimide resin | BMI-2300 | 99 | 22 | 77 | 65 | |
| | BMI-70 | | | | 9 | |
| bis(trifluoromethyl) benzidine | TFMB | 3 | 3 | | | |
| benzoxazine resin | P-d | 23 | | 23 | 20 | |
| | PF-3500 | | | | 2 | |
| epoxy resin | HP-6000 | | | | 4 | |
| polyolefin | JP-100 | | | | | |
| | Ricon184MA6 | | | | | |
| | D1155E | | | | | |
| inorganic filler | SC-2500-SMJ | 250 | 250 | 250 | 250 | 250 |
| catalyst | 25B | 0.5 | 0.5 | 0.5 | 0.5 | 0.5 |
| solvent | MEK | PA | PA | PA | PA | PA |
| | DMAC | | | | PA | |

| Property | Unit | C1 | C2 | C3 | C4 | C5 |
|---|---|---|---|---|---|---|
| copper foil peeling strength | lb/in | 4.5 | 4.7 | 3.7 | 3.8 | 4.7 |
| dissipation factor | none | 0.0091 | 0.0092 | 0.0082 | 0.0082 | 0.0097 |
| glass transition temperature | ° C. | 255 | 287 | 246 | 239 | 297 |
| ratio of thermal expansion | % | 0.83 | 0.67 | 0.81 | 0.80 | 0.64 |
| cure shrinkage | μm | 1.34 | 0.57 | 1.08 | 1.14 | 0.59 |

TABLE 5

Resin compositions of Comparative Examples (in part by weight) and test results

| | Component | C6 | C7 | C8 | C9 | C10 |
|---|---|---|---|---|---|---|
| first prepolymer | first prepolymer 1 | | 125 | | | |
| | first prepolymer 2 | | | | | |
| | first prepolymer 3 | | | | | |
| | first prepolymer 4 | | | | | |
| prepolymer | prepolymer of maleimide resin and cyanate ester resin | | | | | 100 |
| second prepolymer | second prepolymer 1 | 125 | | | | 25 |
| | second prepolymer 2 | | | | | |
| | second prepolymer 3 | | | | | |
| prepolymer | prepolymer of maleimide resin and aniline compound | | | 125 | | |
| | prepolymer of maleimide resin and diamino diphenyl sulfone | | | | 125 | |
| polyphenylene ether resin | OPE-2st 1200 | | | | | |
| maleimide resin | BMI-2300 | | | | | |
| | BMI-70 | | | | | |

TABLE 5-continued

Resin compositions of Comparative Examples (in part by weight) and test results

| | | | | | | |
|---|---|---|---|---|---|---|
| bis(trifluoromethyl) benzidine | TFMB | | | | | |
| benzoxazine resin | P-d | | | | | |
| | PF-3500 | | | | | |
| epoxy resin | HP-6000 | | | | | |
| polyolefin | JP-100 | | | | | |
| | Ricon184MA6 | | | | | |
| | D1155E | | | | | |
| inorganic filler | SC-2500-SMJ | 250 | 250 | 250 | 250 | 250 |
| catalyst | 25B | 0.5 | 0.5 | 0.5 | 0.5 | 0.5 |
| solvent | MEK | PA | PA | PA | PA | PA |
| | DMAC | | | | | |

| Property | Unit | C6 | C7 | C8 | C9 | C10 |
|---|---|---|---|---|---|---|
| copper foil peeling strength | lb/in | 2.3 | 4.6 | 4.6 | 4.7 | 2.9 |
| dissipation factor | none | 0.0055 | 0.0093 | 0.0099 | 0.0098 | 0.0058 |
| glass transition temperature | °C. | 216 | 290 | 288 | 208 | 213 |
| ratio of thermal expansion | % | 0.80 | 0.60 | 0.79 | 0.92 | 0.97 |
| cure shrinkage | μm | 0.98 | 0.83 | 1.36 | 1.28 | 1.52 |

Samples (specimens) for the properties measured above were prepared as described below and tested and analyzed under specified conditions below.

Prepreg: Resin composition (in part by weight) from each Example (E1-E21) or each Comparative Example (C1-C10) was separately added to a stirred tank and well-mixed to form a varnish. Then the varnish was loaded to an impregnation tank, and a fiberglass fabric (e.g., 2116 or 1080 E-glass fiber fabric, available from Asahi) was impregnated into the impregnation tank to adhere the resin composition onto the fiberglass fabric, followed by heating and baking at 140° C. for about 4 minutes to obtain a prepreg.

Copper-containing laminate (i.e., copper-clad laminate, 8-ply, formed by lamination of eight prepregs): Two 18 μm RTF (reverse treatment foil) copper foils and eight prepregs obtained from 2116 E-glass fiber fabrics impregnated with each Example or Comparative Example were prepared, each prepreg having a resin content of about 55%. A copper foil, eight prepregs and a copper foil were superimposed in such order and then subjected to a vacuum condition for lamination at 30 kgf/cm² pressure and 220° C. for 120 minutes to form each copper-containing laminate sample. Insulation layers were formed by laminating eight sheets of prepreg between the two copper foils, and the resin content of the insulation layers is about 55%.

Copper-containing laminate (i.e., copper-clad laminate, 2-ply, formed by lamination of two prepregs): Two 18 μm RTF (reverse treatment foil) copper foils and two prepregs obtained from 1080 E-glass fiber fabrics impregnated with each Example or Comparative Example and having a resin content of about 70% were prepared and stacked in the order of one copper foil, two prepregs and one copper foil, followed by lamination under vacuum at 30 kgf/cm² pressure and 220° C. for 120 minutes to form a copper-containing laminate. Insulation layers were formed by laminating two sheets of prepreg between the two copper foils, and the resin content of the insulation layers is about 70%.

Copper-free laminate (8-ply, formed by lamination of eight prepregs): Each aforesaid copper-containing laminate (8-ply) was etched to remove the two copper foils to obtain a copper-free laminate (8-ply) formed by laminating eight sheets of prepreg and having a resin content of about 55%.

Copper-free laminate (2-ply, formed by lamination of two prepregs): Each aforesaid copper-containing laminate (2-ply) was etched to remove the two copper foils to obtain a copper-free laminate (2-ply) formed by laminating two sheets of prepreg and having a resin content of about 70%.

For each sample, test items and test methods are described below.

Copper Foil Peeling Strength (a.k.a. Peeling Strength, P/S)

The copper-containing laminate (obtained by laminating eight prepregs) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate. In the technical field to which the present disclosure pertains, higher copper foil peeling strength is better. Generally, a difference in copper foil peeling strength of greater than 0.3 lb/in represents a significant difference (i.e., significant technical difficulty).

Dissipation Factor (Df)

The aforesaid copper-free laminate (obtained by laminating two prepregs, having a resin content of about 70%) was subjected to dissipation factor measurement. Each sample was measured by using a microwave dielectrometer (available from AET Corp.) by reference to JIS C2565 at room temperature (about 25° C.) and under 10 GHz frequency. Lower dissipation factor represents better dielectric properties of the sample. Generally, a difference in Df value of less than 0.0005 represents no substantial difference (i.e., no significant technical difficulty) in dissipation factor of different laminates, and a difference in Df value of greater than or equal to 0.0005 represents a substantial difference in dissipation factor of different laminates.

Glass Transition Temperature (TMA Tg)

A copper-free laminate (obtained by laminating eight prepregs) sample was subjected to glass transition temperature measurement by using the thermal mechanical analysis (TMA) method. Each sample was heated from 35° C. to 350° C. at a heating rate of 10° C./minute and then subjected to the measurement of glass transition temperature (° C.) by reference to the method described in IPC-TM-650 2.4.24.5, wherein higher glass transition temperature is more preferred.

Ratio of Thermal Expansion

The copper-free laminate (obtained by laminating eight prepregs) sample was subjected to thermal mechanical analysis (TMA) during the ratio of thermal expansion (Z-axis) measurement. Each sample was heated from 35° C. to 270° C. at a heating rate of 10° C./minute and then subjected to the measurement of ratio of thermal expansion (%) in Z-axis from 50° C. to 260° C. by reference to the method described in IPC-TM-650 2.4.24.5. Lower ratio of thermal expansion represents a better property of the sample. Generally, a difference in ratio of thermal expansion of greater than or equal to 0.1% represents a substantial difference.

Cure Shrinkage

The copper-free laminate (obtained by laminating eight prepregs) sample was subjected to thermal mechanical analysis (TMA) during the cure shrinkage measurement. Each sample was heated from 35° C. to 210° C. at a heating rate of 10° C./minute and then cooled to 35° C. to measure the difference (A−B) in size (μm) before heating (size A at the initial 35° C.) and after heating (size B when being cooled to 35° C. after heating). Generally, a difference in cure shrinkage of greater than or equal to 0.02 μm represents a substantial difference.

The following observations can be made according to the test results above.

From the comparison of Examples E1 to E21 and Comparative Examples C1 to C10, it can be observed that Comparative Example C1, which contains maleimide resin, benzoxazine resin and bis(trifluoromethyl)benzidine individually, i.e., without prepolymerizing maleimide resin, benzoxazine resin and bis(trifluoromethyl)benzidine, has worse ratio of thermal expansion, worse glass transition temperature and worse dissipation factor.

Comparative Example C2, which contains a prepolymer of maleimide resin and benzoxazine resin and further contains maleimide resin and bis(trifluoromethyl) benzidine individually, i.e., without prepolymerizing maleimide resin and bis(trifluoromethyl)benzidine, has worse ratio of thermal expansion and worse dissipation factor.

Comparative Examples C3 and C4, which contain a prepolymer of maleimide resin and bis(trifluoromethyl)benzidine and further contain maleimide resin and benzoxazine resin individually, i.e., without prepolymerizing maleimide resin and benzoxazine resin, have worse ratio of thermal expansion and worse glass transition temperature.

Comparative Example C5, which contains a prepolymer of maleimide resin and Mosacure 310 (aniline compound) in place of a prepolymer of maleimide resin and bis(trifluoromethyl)benzidine, has worse ratio of thermal expansion and worse dissipation factor.

Comparative Example C6 contains only a prepolymer of maleimide resin and bis(trifluoromethyl)benzidine and has worse ratio of thermal expansion, worse glass transition temperature and worse copper foil peeling strength.

Comparative Example C7 contains only a prepolymer of maleimide resin and benzoxazine resin and has worse ratio of thermal expansion and worse dissipation factor.

Comparative Examples C8 and C9 contain only a prepolymer of maleimide resin and an amine compound different from bis(trifluoromethyl)benzidine and have worse ratio of thermal expansion and worse dissipation factor.

Comparative Example C10 contains a prepolymer of maleimide resin and cyanate ester resin in place of a prepolymer of maleimide resin and benzoxazine resin and has worse ratio of thermal expansion, worse glass transition temperature and worse copper foil peeling strength.

In contrast, Examples E1 to E21 can all achieve a better ratio of thermal expansion (i.e., a ratio of thermal expansion as measured by reference to IPC-TM-650 2.4.24.5 of less than or equal to 0.5%).

Compared with other Examples, Example E9 contains an excessive amount of prepolymer of maleimide resin and bis(trifluoromethyl)benzidine (i.e., amount of second prepolymer being 50 parts by weight) and has worse copper foil peeling strength; Example E10 contains an insufficient amount of prepolymer of maleimide resin and bis(trifluoromethyl)benzidine (i.e., amount of second prepolymer being 3 parts by weight) and has worse dissipation factor. In contrast, other Examples can all achieve better ratio of thermal expansion (i.e., a ratio of thermal expansion as measured by reference to IPC-TM-650 2.4.24.5 of less than or equal to 0.5%), better copper foil peeling strength (a copper foil peeling strength as measured by reference to IPC-TM-650 2.4.8 of greater than or equal to 3.5 lb/in) and better dissipation factor (a dissipation factor as measured by reference to JIS C2565 at 10 GHz of less than or equal to 0.0085) at the same time.

In addition, Examples E14 to E19 further contain an epoxy-containing polybutadiene and have better cure shrinkage (cure shrinkage as measured by thermomechanical analysis of less than or equal to 0.60 μm). Examples E14 to E16 and E19 further use 5 to 20 parts by weight of the epoxy-containing polybutadiene and have even better cure shrinkage (cure shrinkage as measured by thermomechanical analysis of less than or equal to 0.40 μm).

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition comprising a first prepolymer and a second prepolymer, the first prepolymer being prepared from a first mixture subjected to a prepolymerization reaction, the second prepolymer being prepared from a second mixture subjected to a prepolymerization reaction, wherein the first mixture comprises a maleimide resin and a benzoxazine resin, and the second mixture comprises a maleimide resin and a bis(trifluoromethyl)benzidine.

2. The resin composition of claim 1, wherein the first mixture comprises 100 parts by weight of the maleimide resin and 10 to 30 parts by weight of the benzoxazine resin.

3. The resin composition of claim 1, wherein the first mixture further comprises a first prepolymerization additive comprising a vinyl-containing polyphenylene ether resin, a small molecule vinyl compound, an acrylate, an epoxy resin, a cyanate ester resin, a phenolic resin or a combination thereof.

4. The resin composition of claim 1, wherein the second mixture comprises 100 parts by weight of the maleimide resin and 7.5 to 30 parts by weight of the bis(trifluoromethyl)benzidine.

5. The resin composition of claim 1, wherein, in the second mixture, a ratio of an equivalent of vinyl group of the maleimide resin and an equivalent of amino group of the bis(trifluoromethyl)benzidine is 1:1 to 5:1.

6. The resin composition of claim 1, wherein the second mixture further comprises a second prepolymerization additive comprising a vinyl-containing polyphenylene ether resin, a small molecule vinyl compound, an acrylate, a polyolefin or a combination thereof.

7. The resin composition of claim 1, comprising 100 parts by weight of the first prepolymer and 3 to 50 parts by weight of the second prepolymer.

8. The resin composition of claim 7, comprising 100 parts by weight of the first prepolymer and 8 to 35 parts by weight of the second prepolymer.

9. The resin composition of claim 1, further comprising a crosslinking agent which comprises a maleimide resin, a vinyl-containing polyphenylene ether resin, a small molecule vinyl compound, an acrylate, a polyolefin, an epoxy resin, a cyanate ester resin, a phenolic resin, a styrene maleic anhydride, a polyester resin, an amine curing agent, a polyamide resin, a polyimide resin or a combination thereof.

10. The resin composition of claim 9, wherein the polyolefin comprises a styrene-butadiene copolymer, a hydrogenated styrene-butadiene copolymer, a polybutadiene, a styrene-butadiene-divinylbenzene terpolymer, a styrene-butadiene-maleic anhydride terpolymer, a maleic anhydride-butadiene copolymer or a combination thereof.

11. The resin composition of claim 10, wherein the polybutadiene comprises an epoxy-containing polybutadiene.

12. The resin composition of claim 7, further comprising 1 to 25 parts by weight of an epoxy-containing polybutadiene.

13. The resin composition of claim 7, further comprising 5 to 20 parts by weight of an epoxy-containing polybutadiene.

14. The resin composition of claim 1, further comprising: flame retardant, inorganic filler, curing accelerator, polymerization inhibitor, solvent, silane coupling agent, coloring agent, toughening agent or a combination thereof.

15. An article made from the resin composition of claim 1, comprising a prepreg, a resin film, a laminate or a printed circuit board.

16. The article of claim 15, having a copper foil peeling strength as measured by reference to IPC-TM-650 2.4.8 of greater than or equal to 3.0 lb/in.

17. The article of claim 15, having a dissipation factor as measured by reference to JIS C2565 at 10 GHz of less than or equal to 0.0090.

18. The article of claim 15, having a ratio of thermal expansion as measured by reference to IPC-TM-650 2.4.24.5 of less than or equal to 0.5%.

19. The article of claim 15, having a cure shrinkage as measured by thermomechanical analysis of less than or equal to 0.60 μm.

* * * * *